United States Patent [19]

Omori

[11] Patent Number: 4,712,826
[45] Date of Patent: Dec. 15, 1987

[54] AUTOMOTIVE WINDOW AND MOLDING ASSEMBLY HAVING A DEVICE FOR MOUNTING A CORNER JOINT

[75] Inventor: Kiyoshi Omori, Utsunomiya, Japan

[73] Assignee: Nissan Motor Co., Ltd., Japan

[21] Appl. No.: 945,966

[22] Filed: Dec. 24, 1986

[30] Foreign Application Priority Data

Dec. 28, 1985 [JP] Japan ................ 60-299193

[51] Int. Cl.⁴ .............................................. B60J 1/02
[52] U.S. Cl. ...................................... 296/93; 49/495; 296/201; 52/208
[58] Field of Search ............... 296/93, 84 D, 84 R, 296/201; 49/495; 52/208

[56] References Cited

U.S. PATENT DOCUMENTS

| 4,405,174 | 9/1983 | Yamane et al. ............ 296/201 |
| 4,523,783 | 6/1985 | Yamada .......................... 296/93 |
| 4,650,240 | 3/1987 | Rinella .......................... 296/93 |

FOREIGN PATENT DOCUMENTS

| 0157281 | 3/1985 | European Pat. Off. . |
| 57-44088 | 3/1982 | Japan . |
| 116221 | 7/1983 | Japan . |
| 59-110218 | 7/1984 | Japan . |
| 59-195416 | 11/1984 | Japan , |
| 60-146716 | 8/1985 | Japan . |
| 1308312 | 2/1973 | United Kingdom . |
| 2175634 | 12/1986 | United Kingdom . |

Primary Examiner—Robert R. Song
Attorney, Agent, or Firm—Leydig, Voit & Mayer

[57] ABSTRACT

A window glass is supported on a support pin which is in turn installed on a vehicle body. A double-faced adhesive tape is interposed between the support pin and the window glass for temporary attachment of the window glass to the vehicle body. A space is provided between the window glass and the vehicle body and filled with sealant-adhesive for permanent attachment of the window glass to the vehicle body. A corner joint of a window molding has a head portion covering a corner portion of the space and an anchor portion inserted into the space to be secured by the sealant-adhesive to the vehicle body. The anchor portion is L-shaped in cross section so as to cooperate with the head portion to clamp therebetween the window glass for temporary attachment of the corner joint to the vehicle body and the window glass.

8 Claims, 8 Drawing Figures

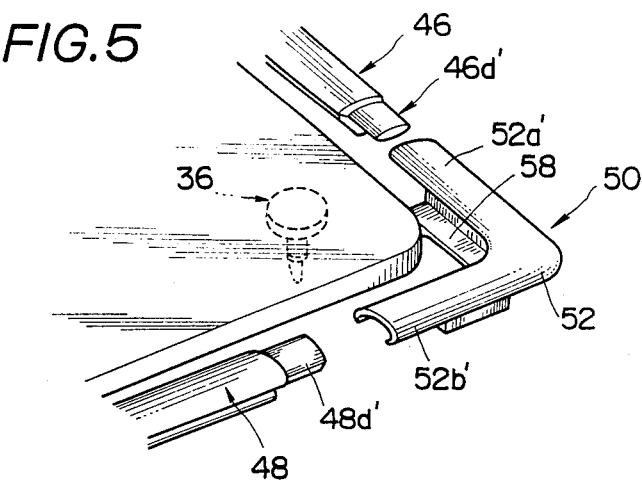
FIG.5
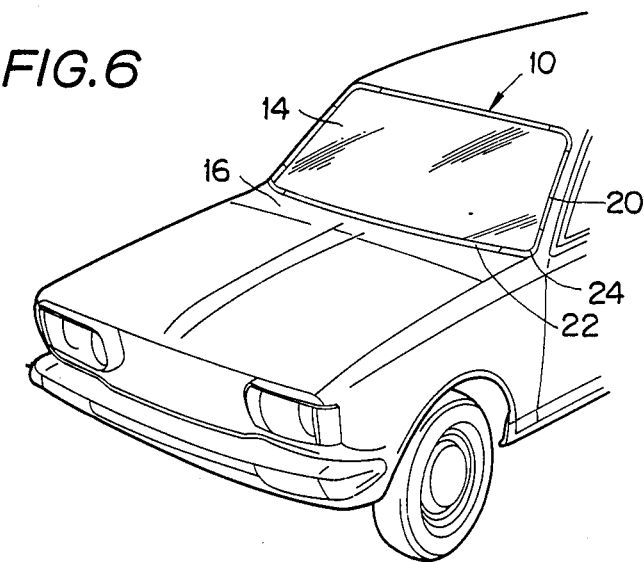
FIG.6
FIG.7 (PRIOR ART)
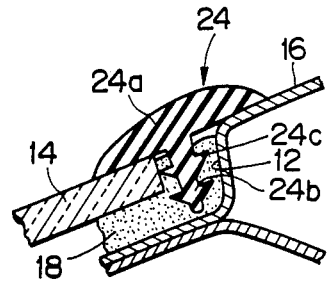
FIG.8 (PRIOR ART)
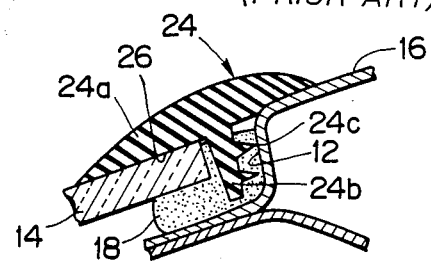

AUTOMOTIVE WINDOW AND MOLDING ASSEMBLY HAVING A DEVICE FOR MOUNTING A CORNER JOINT

BACKGROUND OF THE INVENTION

1. Field of the Invention

The present invention relates in general to a molding for an automotive vehicle window of the kind using sealant-adhesive for securing the molding as well as a window glass to a vehicle body and more particularly to a window and molding assembly for mounting an automotive vehicle window of the above described kind.

2. Description of the Prior Art

An automotive vehicle window molding of the above described kind is well known in the art as disclosed in the Japanese Provisional Patent Publication Nos. 59-195416 and 60-146716 and the Japanese Provisional Utility Model Publication Nos. 57-44088 and 59-110218 and an example thereof is also shown in FIGS. 6 and 7.

Referring to FIGS. 6 and 7, a window molding 10 is used for covering the space 12 which is located between a window glass 14 and a vehicle body 16 and filled with sealant-adhesive 18. For the reason of the manufacturing and installation difficulty, the window molding 10 is constituted by a plurality of independent molding elements including a pair of elongated molding elements 20, 22 and a corner joint 24 extending between the molding elements 20, 22.

The corner joint 24 consists of a head portion 24a, a leg portion 24b and an arm portion 24c provided to the leg portion 24b. The corner joint 24 is fixed by allowing the leg portion 24b to be retained by the sealant-adhesive 18 in the space 12 and adapted to lap at its opposite ends over the molding elements 20, 22 to interconnect the same.

FIG. 8 shows another example in which a double-faced adhesive type 26 is interposed between the head portion 24a of the corner joint 24 and the window glass 14 to attach the former to the latter.

The corner joint 24 encounters the following problems in its installation. In the case of the corner joint 24 in FIG. 7, while the leg portion 24b being provided with the arm portion 24c, such an arm portion 24c does not function until the sealant-adhesive 18 is solidified, resulting in the tendency that the corner joint 24 is elevated from its correct position during the time necessitated for the solidification of the sealant-adhesive 18 and in the worst case the corner joint 24 falls off from the space 12. In the case of the corner joint 24 in FIG. 8, while the head portion 24a of the corner joint 24 being attached by the double-faced adhesive tape 26 to the window glass 14, such a tape 26 inevitably requires an excess working time for its installation and furthermore it cannot prevent the above described elevation assuredly and perfectly.

SUMMARY OF THE INVENTION

In accordance with the present invention, there is provided a novel and improved window and molding assembly for mounting an automotive vehicle window. The assembly comprises a window glass having a corner portion, a vehicle body having a flanged opening portion for receiving the window glass in such a manner as to provide a space between the window glass and the vehicle body, the space being filled with sealant-adhesive and having a corner portion located correspondingly to the corner portion of the window glass and a pair of elongated portions diverging from the corner portion of the space, the corner joint having a head portion extending between the window glass and the vehicle body to cover the corner portion of the space and an anchor portion inserted into the space, the anchor portion being L-shaped in cross section so as to cooperate with the head portion to clamp therebetween the window glass, the window molding having, in addition to the corner joint, a pair of elongated molding elements covering the elongated portions of the space, the flanged opening portion of the vehicle body having a corner located correspondingly to the corner portion of the window glass and being formed with a hole at the corner thereof, a support pin having at an upper end thereof a head portion supporting the corner portion of the window glass and a leg portion fitted in the hole of the flanged opening portion, and adhesive means for adhesively attaching the corner portion of the window glass to the head portion of the support pin.

The above structure is effective for solving the above noted problems inherent in the prior art.

It is accordingly an object of the present invention to provide a novel and improved window and molding assembly for mounting an automotive vehicle window which can assuredly and perfectly prevent the corner joint of the window molding from being elevated from its correct position during the time necessitated for the solidification of sealant-adhesive.

It is another object of the present invention to provide a novel and improved window and molding assembly of the above described character which provides for easier alignment of the corner joint with its adjacent molding elements.

BRIEF DESCRIPTION OF THE DRAWINGS

FIG. 5 is a view similar to FIG. 1 but showing another embodiment of the present invention;

FIG. 6 is a perspective view of a window molding which is for use with a windshield at the front of an automotive vehicle and to which the present invention is applicable; and FIGS. 7 and 8 are sectional views of prior art mounting systems.

DETAILED DESCRIPTION OF THE PREFERRED EMBODIMENTS

Figure 1:
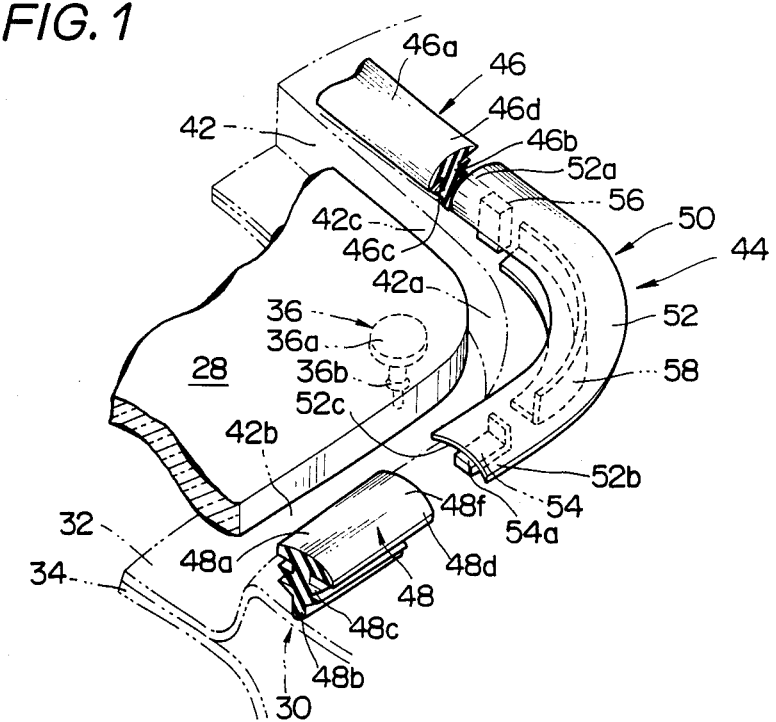
FIG. 1 is an exploded, perspective view of a window and molding assembly for mounting an automotive vehicle window according to an embodiment of the present invention.
Figure 2:
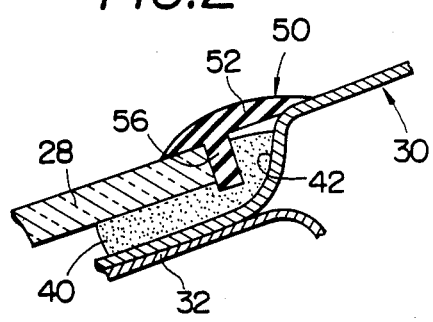
FIG. 2 is a sectional view of the assembly of FIG. 1 at a place where the corner joint of the window molding is provided with a location projection.

Referring to FIGS. 1-4, designated by the reference numeral 28 is a rectangular window glass and by 30 an automotive vehicle body. The vehicle body 30 has a flanged opening portion 32 defining a window receiving opening 34. The flanged opening portion 32 is formed at its corner with a hole 32a for installing therein a snap-on support pin 36 for support of the window glass 28. In this embodiment, though not shown, the flanged opening portion 32 has four corners corresponding to the corners of the window glass 28, each of which corners of the flanged opening portion 32 is formed with the above described hole 32a for installation of the support pin 36. Each support pin 36 has at an upper free end thereof a larger diameter head portion 36a adhesively attached to the window glass 28 by way of a double-faced adhesive tap 38 and a smaller diameter leg portion 36b snap-on fitted in the hole 32a. The support pins 36 are installed in the holes 32a and support the window glass 28 prior to application of sealant-adhesive 40 to the flanged opening portion 32.

Between the window glass 28 and the vehicle body 30 there is provided a space 42 which extends around the periphery of the window glass 28. The space 42 is filled with the sealant-adhesive 40 prior to installation of a window molding 44. The window molding 44 is disposed between the window glass 28 and the vehicle body 30 to cover the space 42. The space 42 includes a corner portion 42a and a pair of elongated portions 42b, 42c diverging from the corner portion 42a. The window molding 44 is constituted by a plurality of independent molding elements including a pair of elongated molding elements 46, 48 covering the elongated portions 42b, 42c of the space 42 and a corner joint 50 extending between the adjacent ends of the elongated elements to cover the corner portion 42a of the space 42. The molding elements 46, 48 respectively consist of head portions 46a, 48a extending between the window glass 28 and the vehicle body 30 to cover the space 42 and leg portions 46b, 48b inserted into the space 42 to be secured by the sealant-adhesive 40 therein to the vehicle body 30. The leg portions 46b, 48b are respectively provided with arm portions 46c, 48c for assured retention of the molding elements 46, 48. The molding elements 46, 48 are installed by inserting the leg portions 46a, 48a into the space 42 so as to be secured by the sealant-adhesive 40. In this connection, when the leg portions 46a, 48a are inserted into the space 42, the arm portions 46c, 48c are caused to abut upon the opposite sides of the spaces 42, i.e., upon the window glass 28 and the vehicle body 30 so as to urge the window glass 28 inwards of the window receiving opening 34. One 48 of the molding elements has an end portion 48d which is constituted by the head portion 48a only, i.e., which end portion 48d is not provided with the leg portion 48b.

The corner joint 50 consists of a head portion 52 extending between the window glass 28 and the vehicle body 30 to cover the corner portion 42a of the space 42, a hook 54 provided to a connecting end 52b of the head portion 52 and projecting downwards therefrom, a rectangular location projection 56 provided to the other connecting end 52a opposite to the connecting end 52a of the heading portion 52 and projecting downwards therefrom, and an anchor portion 58 provided to the head portion 52 at a place intermediate between the hook 52 and the location projection 56 and projecting downwards therefrom.

The location porojection 56 is integral with the head portion 52 and adapted to abut upon an end face of the window glass 28 to locate the corner joint 50 relative to the elongated element 46 in the width direction thereof.

Figure 3:
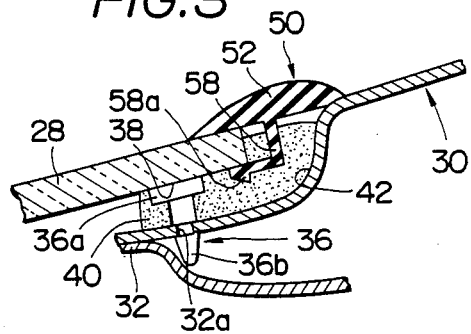
FIG. 3 is a sectional view of the assembly of FIG. 1 at a place where the corner joint is provided with an anchor.
Figure 4:
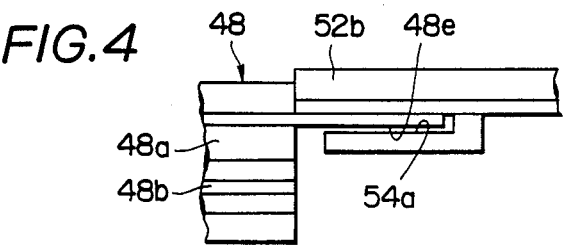
FIG. 4 is a sectional view of the assembly of FIG. 1 at a place where the corner joint is provided with a hook.

The anchor portion 58, as shown in FIG. 3, is integral with the head portion 52 and L-shaped in section so as to cooperate with the head portion 52 to hold or clamp therebetween the corner portion of the window glass 28, whereby the assuredly and perfectly prevent the corner joint 50 from being elevated from its correct position. The anchor portion 58 has at its free end thereof a finger 58a for assured retention of the corner joint 50 in the width direction thereof.

The hook 54 is integral with the head portion 52 and L-shaped so as to cooperate with the head portion 52 to hold therebetween the end portion 48d of the elongated element 48. In this instance, the hook 54 is brought into engagement at its upper flat face 54a with an inner flat face 48e of the end portion 48d of the molding element 48 while the connecting end 52b of the head portion 52 is brought into engagement at its inner concave surface 52c with an outer convex surface 48f of the end portion 48d of the elongated element 48. The flat surfaces 48e, 54a and the convex and concave surfaces 48f, 52c are operative for assured alignment of the corner joint 50 with the molding element 48, i.e., operative to locate the same relative to each other.

In installation, the connecting end 52b of the head portion 52 is first lapped over the end portion 48d of the molding element 48 in such a manner as to allow the end portion 48d to be slightly clamped between the head portion 52 and the hook 54, and then the head portion 52 is pushed downwards so as to allow the anchor portion 58 and the head portion 52 to clamp therebetween the window glass 28 while at the same time the head portions 52 being moved towards the molding element 48 until the location projection 56 abuts upon the end face of the window glass 28. The connecting end 52a of the head portion 52 is lapped in place over the corresponding end portion 46d of the molding element 46 when the corner joint 50 is installed in place in the above manner.

FIG. 5 shows another embodiment which differs from the previous embodiment in that in place of the location projection 56 and the hook 54, the end portions 46d', 48d' of the molding elements 46, 48 are oval-shaped in cross section while the connecting ends 52a', 52b' of the head portion 52 of the corner joint 50 are sheathed, i.e., have a C-like cross section, so as to fittingly receive therein the end portions 46d', 48d' of the molding elements 46, 48, whereby the corner joint 50 can be aligned with the molding elements 46, 48. In installation, the corner joint 50 and the molding elements 46, 48 are first joined together to form a single unit which is then inserted into the space 42 in such a manner as to allow the head portion 52 and the anchor portion 58 to clamp therebetween the window glass 28.

While the anchor portion 58 of the corner joint 50 has been described and shown as being a single piece, it may be constituted by a plurality of separate pieces.

What is claimed is:

1. A window and molding assembly for mounting an automotive vehicle window, comprising:
    a window glass having a corner portion;
    a vehicle body having a flanged opening portion for receiving said window glass in such a manner as to provide a space between said window glass and said vehicle body;
    sealant-adhesive filling said space, said space having a corner portion located correspondingly to said corner portion of said window glass and a pair of elongated portions diverging from said corner portion of said space;
    a window molding having a corner joint molding element having a head portion extending between said window glass and said vehicle body to cover said corner portion of said space and an anchor portion inserted into said space, said anchor portion being L-shaped in cross section so as to cooperate with said head portion to clamp therebetween said window glass;

said window molding having a pair of elongated molding elements covering said elongated portions of said space and abutting said corner joint molding element;

said flanged opening portion of said vehicle body having a corner located correspondingly to said corner portion of said window glass and being formed with a hole at said corner thereof;

a support pin having at an upper end thereof a head portion supporting said corner portion of said window glass and a leg portion fitted in said hole of said flanged opening portion; and adhesive means for adhesively attaching said corner portion of said window glass to said head portion of said support pin.

2. A window and molding assembly as set forth in claim 1 wherein said corner joint molding element further comprises a location projection provided to one connecting end of said head portion in such a manner as to abut upon an end face of said window glass and thereby align said one connecting end of said head portion with adjacent one of said molding elements, and a hook provided to the other connecting end of said head portion in such a manner as to cooperate with said head portion to hold therebetween an end of the other of said molding elements for thereby aligning said other connecting end of said head portion with said other molding element.

3. A window and molding assembly as set forth in claim 2 wherein the end of said other molding element has an outer convex surface and an inner flat surface, said hook being L-shaped and having an upper flat surface in engagement with the inner flat surface of said other molding element while said other connecting end of said head portion of said corner joint molding element having an inner concave surface in engagement with said outer convex surface of said other molding element.

4. A window and molding assembly as set forth in claim 3 wherein said anchor portion of said corner joint molding element is disposed between said location projection and said hook.

5. A window and molding assembly as set forth in claim 4 wherein each of said elongated molding elements has a head portion extending between said window glass and said vehicle body to cover said space and a leg portion inserted into said space, the end of said other molding element being constituted by said head portion only to provide said inner flat surface.

6. A window and molding assembly as set forth in claim 1 wherein said adhesive means comprises a double-faced adhesive tape interposed between said head portion of said support pin and said corner portion of said window glass.

7. A window and molding assembly as set forth in claim 1 wherein said head portion has opposite connecting ends which are sheathed so as to fittingly receive therein respective corresponding ends of said molding elements.

8. A device as set forth in claim 7 wherein said ends of said elongated molding elements have an oval-shaped cross section, and said connecting ends of said head portion have a C-like cross section.

* * * * *